Dec. 28, 1965 C. R. COUCH 3,225,917
SPLIT SHANK NAIL AND PACKAGING SYSTEM
Filed March 11, 1963

INVENTOR.
CLAUDE R. COUCH
BY
ATTORNEY

United States Patent Office

3,225,917
Patented Dec. 28, 1965

3,225,917
SPLIT SHANK NAIL AND PACKAGING SYSTEM
Claude R. Couch, 2414 Newland St., Edgewater, Colo.
Filed Mar. 11, 1963, Ser. No. 264,162
1 Claim. (Cl. 206—56)

The present invention relates to a type of nail or fastener member which is particularly suited for use in automatic nailing machines. More specifically, the subject of the invention is a split shank T-head nail, which incorporates in its design special packaging advantages and improved holding characteristics.

Previously, many others have been concerned with the design and fabrication of nails that could be conveniently and efficiently used in automatic nailing machines. The objects of most all such prior inventions and the overall objectives of the present invention are essentially the same.

It is a still desirable and worthwhile object of endeavor to provide a nail which:

First, may be used in an automatic nailing machine;
Second, that is easy and economical to manufacture;
Third, that will have adequate or improved holding power; and
Fourth, that may be packaged efficiently and economically.

These objectives are the guide posts of the present invention.

Within such framework, it is the further object of this invention to provide a split shank nail which satisfies such objectives.

Another object of this invention is to provide novel packaging means for holding a plurality of nails in arranged side-by-side relation for convenient use in automatic nailing machines.

Another object of the present invention is to provide a nail in which shank elements are free to bend differentially one from the other to develop increased nail holding power.

A related object of this invention is to provide guide elements for directing the divergent shank bending functions of such nail.

Figure 1:
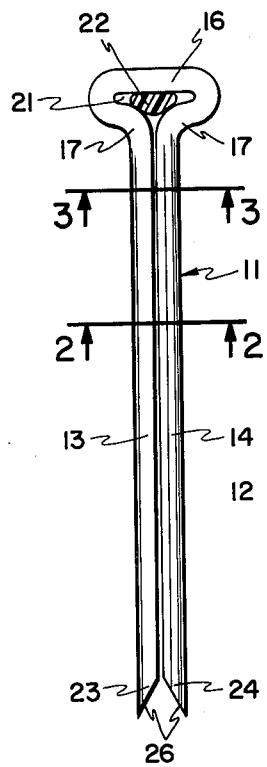
Figure 2:
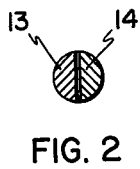
Figure 3:
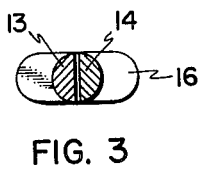
Figure 4:
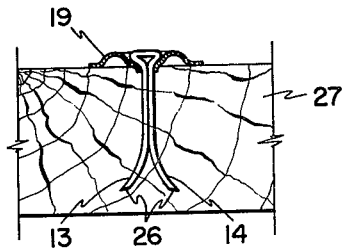
Figure 7:
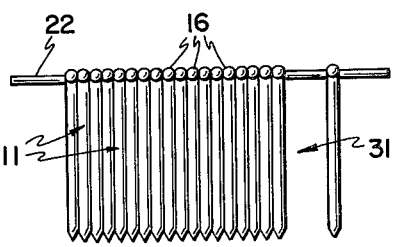
Figure 5:
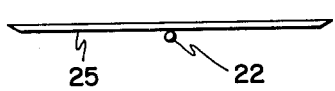
Figure 6:
Figure 8:
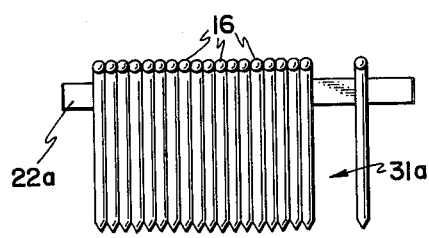

Further objects and advantages of the present invention will be apparent from the appended description and drawings, in which FIG. 1 is a side elevation in partial cross-section showing a split shank nail with a nail packaging strip disposed in the head thereof, FIG. 2 is a cross-sectional elevation taken along the line 2—2 of FIG. 1, FIG. 3 is a cross-sectional elevation taken along the line 3—3 of FIG. 1, FIG. 4 is a cross-sectional elevation showing the disposition of nail shank elements when the nail has been driven into a wood member and through a gusset plate, FIG. 5 is a side elevation showing a step in the fabrication of a nail and nail package utilizing a plastic, cord or strip binder, FIG. 6 is a side elevation similarly illustrating the use of a paper strip binder, FIG. 7 is a side elevation showing the formation of a stick of nails held in side-by-side relation by a plastic element passing through the head of such nails, and FIG. 8 is a side elevation showing a stick of nails held in their desired side-by-side relation by a strip element disposed between the split shanks of such nails.

Briefly stated, the present invention provides a split shank nail having a T head which may be disposed in side-by-side relation for use in automatic nailing machines. Special features include the provision of guide faces which serve to move separate components of the nail shank differentially one from the other to develop greater nail holding power and the further provision of a strip member which is disposed either in the heads of a plurality of nails or between the split shanks thereof so that a plurality of nails will be in a desired side-by-side stick relation when formed.

The detailed features of embodiments of the invention are shown in the accompanying figures. Here it will be noted that the invention provides a nail 11 having a split shank 12 composed of separate symmetrical halves 13 and 14. In the construction of such nail 11 the separate halves are formed from a single strip of material which is bent backwardly upon itself in novel pattern as necessary to provide a T head 16.

Fillet radiuses 17 are maintained at the base of the head to avoid a sharp bend and to further provide increased strength for the resultant connection between the shank 11 and head 16. The fillet radius 17 is similar to that described in copending applications No. 102,500 and No. 164,349. This fillet radius is particularly adapted for secure engagement in gusset plates 19 which may be of the type likewise described in such earlier applications.

As the strip material, which preferably is of half round cross-section, is bent backwardly upon itself to provide the T head 16, a void 21 is created at the center of such head. This void may be beneficially used to receive a strip member 22 that may be passed continuously through the voids 21 in a plurality of nails arranged in side-by-side relation. As later described, the voids 21 and strip members 22 are useful in providing a packaging system for such nails 11.

The lower terminal ends of the split shanks 13 and 14 are provided, respectively, with points 23 and 24 that are mutually divergent each from the other. In nailing operations, as shown in FIGURE 4, the inner guide faces 26 forming such divergent points are brought into contact with the material or wood 27 into which the nail is being driven. The further inward movement of the nail is accompanied by the bending and spreading of the nail shank elements 13 and 14. This divergent bending holds the driven nail more securely in the wood material 27, and where the T head 16 is of sufficient strength, the total holding power for the nail fastener and associated gusset plate 19 is considerably increased. Where desired, the points 23 and 24 may be formed by the intersection of cooperative faces that are disposed at angles other than those illustrated for the guide faces 26. With proper placement of the guide faces, the nail shanks may be caused to bend in other divergent or co-directional patterns to develop the desired shank bending pattern.

The inherent nail packaging advantages of the present embodiment are shown in FIGURES 5 through 8. FIGURES 5 and 7 illustrate the formation of split shank nails about a strip member disposed in the head of such nails. FIGURE 5 illustrates a cut segment of nail forming material 25 and the cross-section of a strip 22 of plastic material. Through use of automatic machinery, a plurality of similar segments 25 are severed from a coil supply (not shown) and moved reciprocally along the axis of the material 25 to position of registration with the strip 22, as illustrated. Subsequently the head 16 and split shank 11 of a nail is formed about the strip 22. As successive nails are formed, the strip 22 may be moved laterally a regulated distance so that a plurality of nails 11 are formed in side-by-side relation and about the strip 22. When a sufficient number of nails have been formed and strung on a strip 22, a stick of nails 31 is formed that may be separated for packaging, transportation, shipment and handling until such assembled stick of nails 31 can be inserted for use in an automatic nailing machine. Since the plastic strip 22 may be of flexible material, the stick of nails 31 will be rather flexibly joined together, and there will be little danger of breakage of the nail stick in subsequent conventional handling operations.

Where the strip 22 is of a shape different than the cross-sectional shape of the formed void 21, the plastic strip will be distorted in shape, as shown in FIGURE 1. Regulated distortion can provide a tighter and more desirable packaging. It should be observed, however, that the strip 22 may, within the keeping of this invention, be of size smaller than the formed void 21. It is possible that the desired stick of nails may be derived by inserting the strip 22 through aligned voids 21.

In the alternate operations illustrated in FIGURES 6 and 8, a flat strip of material 22a is used. Such strip is disposed between the split shank elements 13 and 14. In this embodiment 22a may be of plastics, paper, cardboard or other flexible material. As in the other described operation, the strip 22a may be applied by operations forming the split shank nail thereabout, or other techniques may be used to spread the shanks apart so that the strip 22a may be inserted therebetween. If the nails are to be formed about the strip, the construction shown in FIGURES 6 and 8 has an inherent advantage, since the strip does not have to pass through the same zone in which all of the complicated die forming operations are being accomplished. It is further noted that the assembled stick 31a is relatively more flexible, since the nail heads 16 have a greater freedom of movement.

While separate embodiments of the invention have been shown and described, it should be apparent that the invention is adaptable to various modifications and changes. All such changes as come within the scope of the hereunto appended claim are considered to be a part of this invention.

I claim:

A package of drive type fasteners that are individually made from cut lengths of fastener stock and are presented in side-by-side stick relationship for convenient use in automatic nailing machines comprising a flexible material carrier strip and a plurality of individual fasteners each having a first shank element formed from said fastener stock, a flat driving head element formed from a portion of said stock closely adjacent to said first shank elements and disposed at right angles thereto, and a second shank element formed at right angles to said driving head element and disposed in side-by-side relation with said first shank element to provide a void therebetween of width less than the thickness of said flexible material carrier strip, said shank elements being formed about said flexible carrier strip whereby said carrier strip is deformed within the formed fastener to hold said plurality of fasteners in desired side-by-side stick relationship.

References Cited by the Examiner
UNITED STATES PATENTS

| | | | |
|---|---|---|---|
| 115,175 | 5/1871 | Davis | 1—56 |
| 495,844 | 4/1893 | Solt | 1—56 |
| 2,150,788 | 3/1939 | Shippee et al. | 85—13 |
| 3,031,727 | 5/1962 | Nesbitt | 85—13 |
| 3,090,203 | 5/1963 | Durget | 85—50 |

GRANVILLE Y. CUSTER, JR., *Primary Examiner.*

EDWARD C. ALLEN, *Examiner.*